United States Patent
Wong et al.

(10) Patent No.: US 6,879,089 B2
(45) Date of Patent: Apr. 12, 2005

(54) DAMPED LONGITUDINAL MODE OPTICAL LATCHING RELAY

(75) Inventors: Marvin Glenn Wong, Woodland Park, CO (US); Arthur Fong, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 172 days.

(21) Appl. No.: 10/412,894

(22) Filed: Apr. 14, 2003

(65) Prior Publication Data

US 2004/0201310 A1 Oct. 14, 2004

(51) Int. Cl.[7] .................. H01H 29/00; H01H 57/00; H01L 41/08
(52) U.S. Cl. .................. 310/328; 200/182; 200/187; 200/188; 200/189; 200/211; 200/212; 200/214; 385/9; 385/147
(58) Field of Search .................. 310/328, 333, 310/344, 348; 200/182, 211, 187–189, 212, 214, 215, 219

(56) References Cited

U.S. PATENT DOCUMENTS

| | | | |
|---|---|---|---|
| 2,312,672 A | 3/1943 | Pollard, Jr. .................. 335/58 |
| 2,564,081 A | 8/1951 | Schilling .................. 335/56 |
| 3,430,020 A | 2/1969 | Von Tomkewitsch et al. .................. 200/181 |
| 3,529,268 A | 9/1970 | Rauterberg .................. 335/56 |
| 3,600,537 A | 8/1971 | Twyford .................. 200/407 |
| 3,639,165 A | 2/1972 | Rairden, III .................. 428/433 |
| 3,657,647 A | 4/1972 | Beusman et al. .................. 324/94 |
| 4,103,135 A | 7/1978 | Gomez et al. .................. 200/185 |
| 4,200,779 A | 4/1980 | Zakurdaev et al. .................. 200/187 |
| 4,238,748 A | 12/1980 | Goullin et al. .................. 335/56 |
| 4,245,886 A | 1/1981 | Kolodzey et al. .................. 385/19 |
| 4,336,570 A | 6/1982 | Brower .................. 362/4 |

(Continued)

FOREIGN PATENT DOCUMENTS

| | | |
|---|---|---|
| EP | 0593836 A1 | 10/1992 |
| FR | 2418539 A | 9/1979 |
| FR | 2458138 A1 | 10/1980 |
| FR | 2667396 | 9/1990 |
| JP | SHO 36-18575 | 10/1961 |
| JP | SHO 47-21645 | 10/1972 |
| JP | 63-276838 | 5/1987 |
| JP | 01-294317 | 5/1988 |
| JP | 08-125487 A | 5/1996 |
| JP | 9161640 A | 6/1997 |
| WO | WO 99/46624 A1 | 9/1999 |

OTHER PUBLICATIONS

Jonathan Simon, "A Liquid–Filled Microrelay with a Moving Mercury Microdrop" (Sep. 1997) Journal of Microelectromechanical Systems, vol. 6, No. 3, pp208–216.

(Continued)

Primary Examiner—Thomas M. Dougherty

(57) ABSTRACT

A piezoelectric optical relay is disclosed in which a solid slug moves within a switching channel formed in relay housing. An optical path passing through the switching channel is blocked or unblocked by motion of the solid slug. Motion of the solid slug is controlled by at least two piezoelectric actuators within the switching channel. Motion of the solid slug is resisted by a liquid, such as a liquid metal, that wets between the solid slug and at least one fixed contact pad in the switching channel. The surface tension of the liquid provides a latching mechanism for the relay.

18 Claims, 3 Drawing Sheets

U.S. PATENT DOCUMENTS

| | | | |
|---|---|---|---|
| 4,419,650 A | 12/1983 | John | 337/119 |
| 4,434,337 A | 2/1984 | Becker | 200/220 |
| 4,475,033 A | 10/1984 | Willemsen et al. | 250/201.1 |
| 4,505,539 A | 3/1985 | Auracher et al. | 385/19 |
| 4,582,391 A | 4/1986 | Legrand | 385/17 |
| 4,628,161 A | 12/1986 | Thackrey | 200/21.47 |
| 4,652,710 A | 3/1987 | Karnowsky et al. | 200/235 |
| 4,657,339 A | 4/1987 | Fick | 385/22 |
| 4,742,263 A | 5/1988 | Harnden, Jr. et al. | 310/331 |
| 4,786,130 A | 11/1988 | Georgiou et al. | 385/48 |
| 4,797,519 A | 1/1989 | Elenbaas | 200/226 |
| 4,804,932 A | 2/1989 | Akanuma et al. | 335/38 |
| 4,988,157 A | 1/1991 | Jackel et al. | 385/17 |
| 5,278,012 A | 1/1994 | Yamanaka et al. | 430/30 |
| 5,415,026 A | 5/1995 | Ford | 73/651 |
| 5,502,781 A | 3/1996 | Li et al. | 385/4 |
| 5,644,676 A | 7/1997 | Blomberg et al. | 370/416 |
| 5,675,310 A | 10/1997 | Wojnarowski et al. | 338/309 |
| 5,677,823 A | 10/1997 | Smith | 361/234 |
| 5,751,074 A | 5/1998 | Prior et al. | 307/118 |
| 5,751,552 A | 5/1998 | Scanlan et al. | 361/707 |
| 5,828,799 A | 10/1998 | Donald | 385/16 |
| 5,841,686 A | 11/1998 | Chu et al. | 365/51 |
| 5,849,623 A | 12/1998 | Wojnarowski et al. | 438/382 |
| 5,874,770 A | 2/1999 | Saia et al. | 257/536 |
| 5,875,531 A | 3/1999 | Nellissen et al. | 29/25.35 |
| 5,886,407 A | 3/1999 | Polese et al. | 257/706 |
| 5,889,325 A | 3/1999 | Uchida et al. | 257/724 |
| 5,912,606 A | 6/1999 | Nathanson et al. | 335/47 |
| 5,915,050 A | 6/1999 | Russell et al. | 385/7 |
| 5,972,737 A | 10/1999 | Polese et al. | 138/122 |
| 5,994,750 A | 11/1999 | Yagi | 257/415 |
| 6,021,048 A | 2/2000 | Smith | 361/736 |
| 6,180,873 B1 | 1/2001 | Bitko | 174/9 C |
| 6,201,682 B1 | 3/2001 | Mooij et al. | 361/306.1 |
| 6,207,234 B1 | 3/2001 | Jiang | 427/333 |
| 6,212,308 B1 | 4/2001 | Donald | 386/16 |
| 6,225,133 B1 | 5/2001 | Yamamichi et al. | 438/3 |
| 6,278,541 B1 | 8/2001 | Baker | 359/291 |
| 6,304,450 B1 | 10/2001 | Dibene, II et al. | 361/704 |
| 6,320,994 B1 | 11/2001 | Donald et al. | 385/16 |
| 6,323,447 B1 | 11/2001 | Kondoh et al. | |
| 6,351,579 B1 | 2/2002 | Early et al. | 385/18 |
| 6,356,679 B1 | 3/2002 | Kapany | 200/18 |
| 6,373,356 B1 | 4/2002 | Gutierrez et al. | |
| 6,396,012 B1 | 5/2002 | Bloomfield | 335/233 |
| 6,396,371 B2 | 5/2002 | Streeter et al. | 385/78 |
| 6,408,112 B1 | 6/2002 | Bartels | 29/16 |
| 6,446,317 B1 | 9/2002 | Figueroa et al. | 385/25.42 |
| 6,453,086 B1 | 9/2002 | Tarazona | 385/20 |
| 6,470,106 B2 | 10/2002 | McClelland et al. | 385/16 |
| 6,487,333 B2 | 11/2002 | Fouquet | 385/18 |
| 6,501,354 B1 | 12/2002 | Gutierrez et al. | 335/47 |
| 6,512,322 B1 | 1/2003 | Fong et al. | |
| 6,515,404 B1 | 2/2003 | Wong | |
| 6,516,504 B2 | 2/2003 | Schaper | 29/25.42 |
| 6,559,420 B1 | 5/2003 | Zarev | 219/209 |
| 6,633,213 B1 | 10/2003 | Dove | 335/78 |
| 6,765,161 B1 * | 7/2004 | Wong et al. | 200/182 |
| 6,768,068 B1 * | 7/2004 | Wong et al. | 200/182 |
| 6,798,937 B1 * | 9/2004 | Wong | 385/16 |
| 6,803,842 B1 * | 10/2004 | Wong et al. | 335/47 |
| 2002/0037128 A1 | 3/2002 | Burger et al. | 385/16 |
| 2002/0146197 A1 | 10/2002 | Yong | 385/17 |
| 2002/0150323 A1 | 10/2002 | Nishida et al. | 385/16 |
| 2002/0168133 A1 | 11/2002 | Saito | 3835/16 |
| 2003/0035611 A1 | 2/2003 | Shi | 383/16 |
| 2003/0080650 A1 * | 5/2003 | Wong et al. | 310/328 |

OTHER PUBLICATIONS

Marvin Glenn Wong, "A Piezoelectrically Actuated Liquid Metal Switch", May 1, 2002, U.S. Appl. No. 10/137,691, 12 pages of specification, 5 pages of claims, 1 page of abstract, and 10 sheets of drawings (Figs. 1–10).

Bhedwar, Homi C. et al. "Ceramic Multilayer Package Fabrication." Electronic Materials Handbook, Nov. 1989, pp. 460–469, vol. 1 Packaging, Section 4: Packages.

"Integral Power Resistors for Aluminum Substrate." IBM Technical Disclosure Bulletin, Jun. 1984, US, Jun. 1, 1984, p. 827, vol. 27, No. 1B, TDB–ACC–No.: NB8406827, Cross Reference: 0018–8689–27–1B–827.

Kim, Joonwon et al. "A Micromechanical Switch with Electrostatically Driven Liquid–Metal Droplet," Sensors and Actuators, A: Physical, V 9798, Apr. 1, 2002, 4 pages.

* cited by examiner

DAMPED LONGITUDINAL MODE OPTICAL LATCHING RELAY

CROSS REFERENCE TO RELATED APPLICATIONS

This application is related to the following co-pending U.S. patent applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

FIELD OF THE INVENTION

The invention relates to the field of optical switching relays, and in particular to a piezoelectrically actuated optical relay that latches by means of liquid surface tension.

BACKGROUND

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of vapor bubbles to alter the index of refraction inside a cavity. The moveable mirrors may use electrostatic latching mechanisms, whereas bubble switches do not latch. Piezoelectric latching relays either use residual charges in the piezoelectric material to latch, or actuate switch contacts containing a latching mechanism.

Liquid metal is also used in electrical relays. A liquid metal droplet can be moved by a variety of techniques, including electrostatic forces, variable geometry due to thermal expansion/contraction, and pressure gradients. When the dimension of interest shrinks, the surface tension of the liquid metal becomes the dominant force over other forces, such as body forces (inertia). Consequently, some micro-electromechanical (MEM) systems utilize liquid metal switching.

SUMMARY

The present invention relates to an optical switch in which a solid slug is moved within a channel and used to block or unblock an optical path passing through the channel. The solid slug is moved by piezoelectric elements. In accordance with certain embodiments, the slug is wetted by a liquid, such as liquid metal, that also adheres to wettable metal contact pads within the channel to provide a latching mechanism. Motion of the solid slug may be damped to prevent damage.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
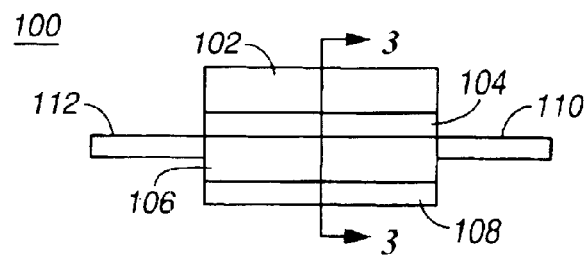
FIG. 1 is an end view of an optical relay in accordance with certain embodiments of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to a piezoelectrically actuated optical relay that switches and latches by means of a wettable magnetic solid slug and a liquid.

In accordance with certain embodiments of the present invention, the relay uses piezoelectric elements to displace a solid magnetic slug. The slug blocks or unblocks an optical path, allowing the switching of optical signals. The solid slug is held in place by surface tension in a liquid, preferably a liquid metal such as mercury, that wets between the solid slug and at least one fixed contact pad on the relay housing. Magnetorestrictive actuators, such as Terfenol-D, that deform in the presence of a magnetic field may be used as an alternative to piezoelectric actuators. In the sequel, piezoelectric actuators and magnetorestrictive actuators will be collectively referred to as "piezoelectric actuators".

In one embodiment, micro-machining techniques are used to manufacture the relay. An end view of an optical relay 100 is shown in FIG. 1. In this embodiment, the body of the relay is made up of four layers and is amenable to manufacture by micro-machining. The lowest layer is a circuit substrate 108 that will be described in more detail below with reference to FIG. 9. The next layer is a switching layer 106. The switching of the optical signal occurs in a switching channel contained in this layer. The next layer is a vent layer 104 that contains pressure relief vents (vias) for relieving pressure variations in the switching channel. The cap layer 102 provides a pressure relief passage or channel that connects the pressure relief vents. In operation, an optical signal enters the relay through an optical fiber or waveguide 110 and, if not blocked in the relay, exits through optical fiber or waveguide 112. The section 3—3 is shown in FIG. 3.

Figure 2:
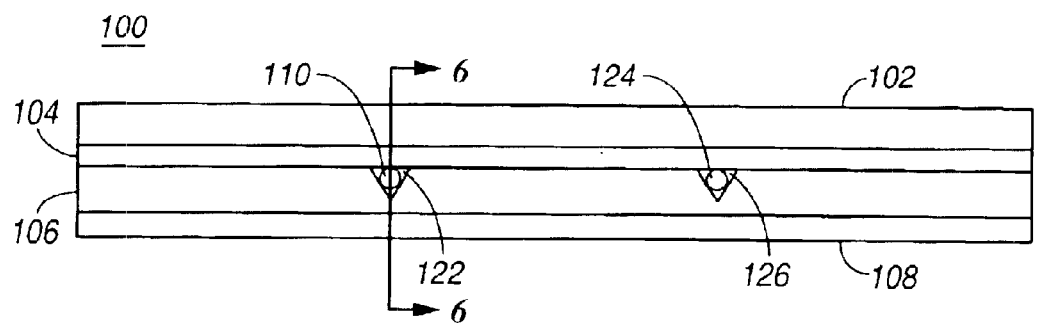
FIG. 2 is a side view of an optical relay in accordance with certain embodiments of the present invention.

FIG. 2 is a side view of the optical relay shown in FIG. 1. Optical fibers 110 and 124 are positioned in alignment notches, 122 and 126 respectively, in the switching layer 106. Each fiber is optically aligned with a corresponding fiber on the opposite side of the relay (as shown in FIG. 1). The optical fibers may be held in place by adhesive.

Figure 3:
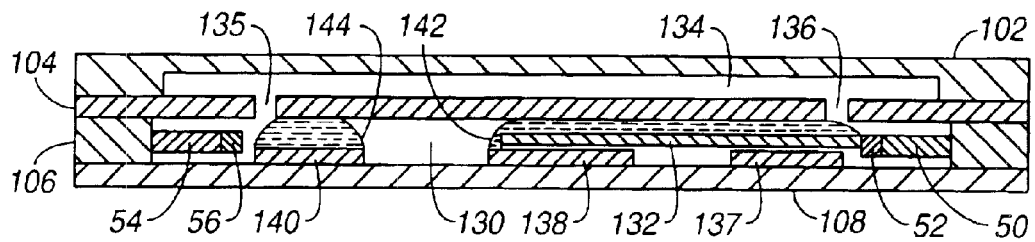
FIG. 3 is a sectional view through an optical relay in accordance with certain embodiments of the present invention.

A view of a longitudinal, vertical cross-section through section 3—3 of the relay in FIG. 1 is shown in FIG. 3. A switching channel 130 is formed in the switching layer 106. A solid slug 132 is moveably positioned within the switching channel. A pressure relief channel 134 is coupled to the ends of the switching channel 130 by vent holes 135 and 136. The pressure relief channel 134 allows pressure variations in the switching channel, due to movement of the solid slug 132, to be equalized by allowing fluid to flow from one end of the switching channel to the other through the vent holes. Three contact pads 137, 138 and 140 are fixed to the circuit substrate 108 within the switching channel. These contact pads may be formed on the circuit substrate 108 by deposition or other micro-machining techniques. The contact pads are wettable by a liquid, such as a liquid metal. When the solid slug 132 is positioned as shown in FIG. 3, a liquid 142 wets the surface of the solid slug and the surface of the contact pads 137 and 138. Surface tension holds the solid slug in this position. Additional liquid 144 wets the contact pad 140.

Piezoelectric elements 50 and 54 are attached to the substrate of the switching layer 106. Electrical connections (not shown) to the piezoelectric elements either pass along the top of the circuit substrate 108 to the edges of the relay or pass through holes or vias in the circuit substrate and connect to connection pads on the bottom of the relay.

Figure 4:
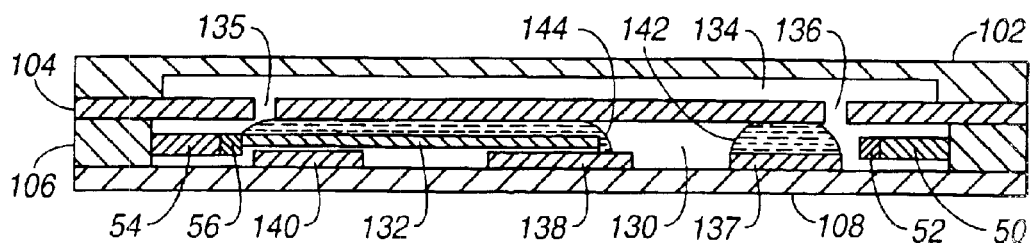
FIG. 4 is a further sectional view through an optical relay in accordance with certain embodiments of the present invention.

When the solid slug occupies the position shown in FIG. 3, the optical path between waveguides 110 and 112 (in FIG. 1) is open, while the optical path through waveguide 124 (in FIG. 2) is blocked by the slug and the liquid. In order to change the switch-state of the relay, the piezoelectric element 50 is energized by applying an electric potential across the element. This causes the piezoelectric element 50 to expand and apply an impulsive force to the end of the solid slug 132. The motion of the piezoelectric element is rapid and causes the imparted momentum of the solid slug to overcome the surface tension forces (from the liquid) that would hold it in contact with the contact pad or pads near the actuating piezoelectric element. The surface tension latch is broken and the solid slug moves to the left end of the switching channel, as shown in FIG. 4. The solid slug 132 is then in wetted contact with the contact pads 138 and 140 and is latched in its new position. In this new position, the optical path between waveguides 110 and 112 (in FIG. 1) is blocked by the slug and the liquid, while the optical path through waveguide 124 (in FIG. 2) is open.

In order to prevent the brittle piezoelectric elements from breaking when the switching slug arrives at its new locations during switching, energy dissipative elements are used to lessen the impact forces. In a first embodiment of the invention, shown in FIG. 3 and FIG. 4, compliant, energy absorptive faces 52 and 56 are used on the piezoelectric elements 50 and 54. Materials such as "Sorbothane" are effective at absorbing shock and vibration. In a second embodiment, energy absorptive faces 52 and 56 are absent and the switching channel is narrowed near the piezoelectric actuators so there is little clearance between the channel walls and the slug between the rest position of the piezoelectric actuator face and the vent opening. When the slug arrives, liquid metal is trapped between the slug and the actuator face and is squeezed through the opening surrounding the slug, thus providing damping. Various passage designs may be used to better control the flow of liquid metal and damping. Referring to FIG. 3, when the actuator 50 pushes the slug 132 to actuate it, the actuator face pushes the slug to the level of the vent opening 136, relieving any vacuum between the actuator face and the end of the slug that would tend to hold the slug back. One advantage of the second embodiment is that there is minimal damping when the slug departs.

The switch-state may be changed back from the switch state shown in FIG. 4 to the original state shown in FIG. 3, by energizing the piezoelectric element 54 to move the solid slug. Once the solid slug has returned to its original position it is again latched into position by surface tension in the liquid.

Figure 5:
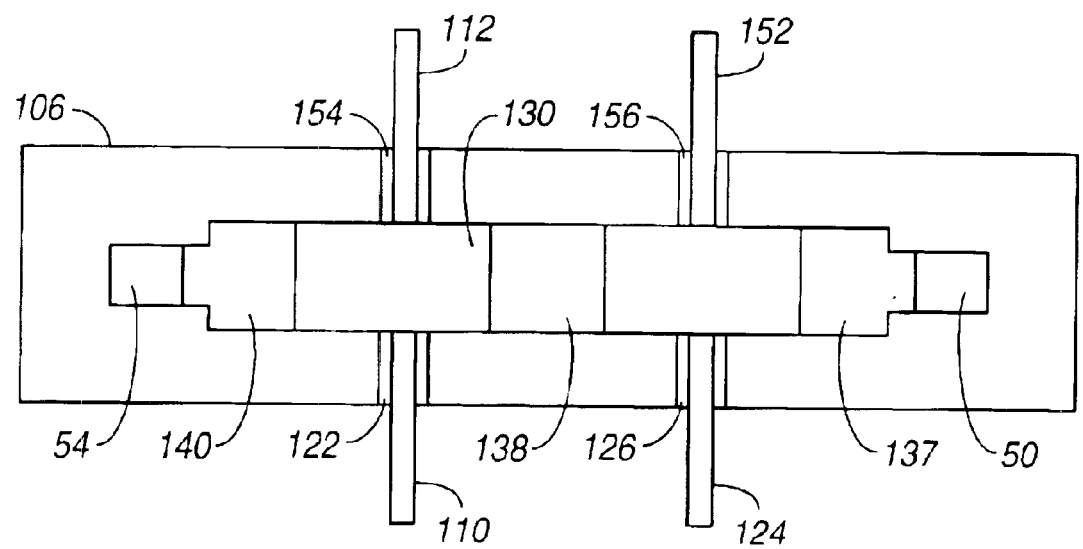
FIG. 5 is a top view of an optical relay with the cap layer and vent layer removed in accordance with certain embodiments of the present invention.

FIG. 5 is a top view of the relay with the solid slug, the cap layer 102 and the vent layer 104 removed. The optical waveguides 110, 112, 124 and 152 are glued into notches 122, 154, 126 and 156 respectively in the switching layer 106. Waveguide 110 is optically aligned with waveguide 112 so that light may couple between the waveguides through the switching channel 130. Similarly, waveguide 124 is optically aligned with waveguide 152 so that light may couple between the waveguides. Contact pads 140, 137 and 138 lie at the bottom of the switching channel 130, and are deposited on top of the circuit substrate. Piezoelectric actuators 50 and 54 are attached to the switching layer 106 within the switching channel 130. When the solid slug bridges the gap between the contact pads 140 and 138, the optical path between the waveguides 110 and 112 is blocked. When the solid slug bridges the gap between the contact pads 137 and 138, the optical path between the waveguides 124 and 152 is blocked.

Figure 6:
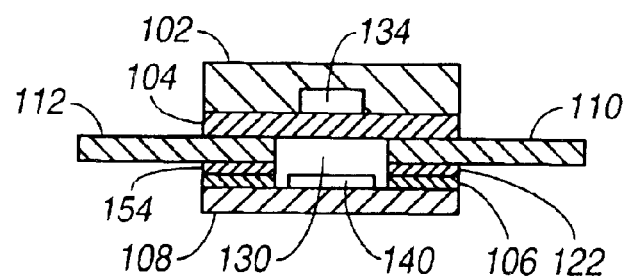
FIG. 6 is a further sectional view through an optical relay in accordance with certain embodiments of the present invention.

FIG. 6 is a sectional view through the section 6—6 shown in FIG. 2. Referring to FIG. 6, the optical waveguides 110 and 112 are positioned in glue-filled notches 122 and 154 respectively in the switching layer 106. Waveguide 110 is optically aligned with waveguide 112 so that light may couple between the waveguides through the switching channel 130. Contact pad 140 lies at the bottom of the switching channel 130. In this embodiment, the pressure relief channel 134 is formed in the cap layer 102. Alternatively, it could be formed in vent layer 104.

Figure 7:
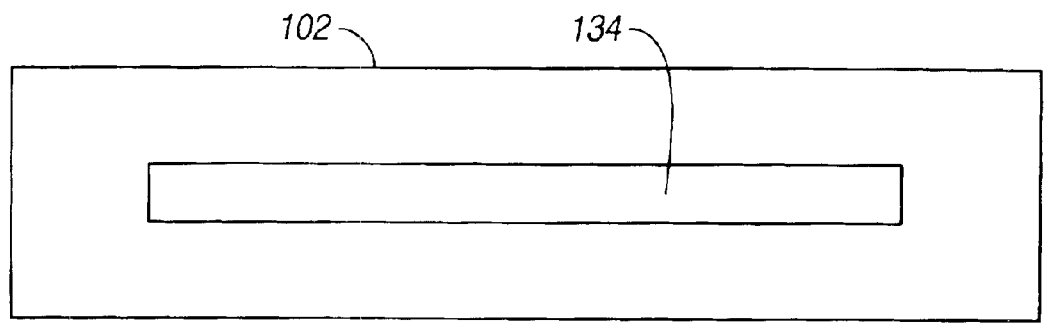
FIG. 7 is a view of the underside of a cap layer of an optical relay in accordance with certain embodiments of the present invention.

FIG. 7 is a view of the underside of the cap layer 102 showing the pressure relief channel 134.

Figure 8:
FIG. 8 is a view of a vent layer of an optical relay in accordance with certain embodiments of the present invention.

FIG. 8 is a top view of the vent layer 104. Vent holes 135 and 136 pass through the layer, coupling the vent passage to the switching channel in the layer below and to the pressure relief channel in the cap layer above.

Figure 9:
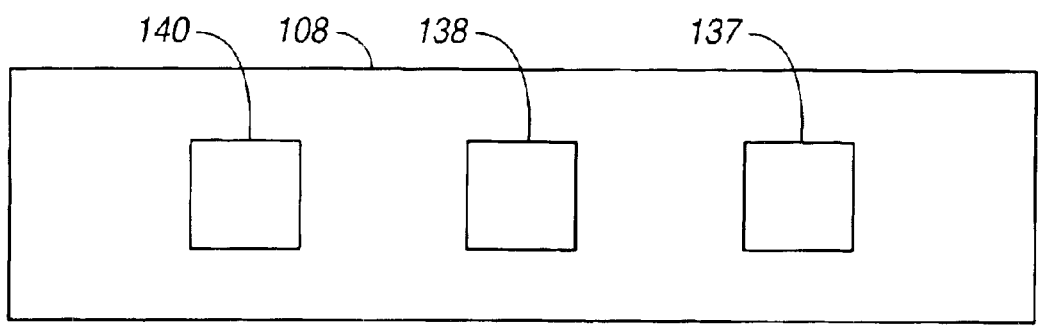
FIG. 9 is a view of a circuit substrate of an optical relay in accordance with certain embodiments of the present invention.

FIG. 9 is a top view of the circuit substrate 108. Three contact pads 137, 138 and 140 are formed on top of the substrate. The surfaces of the contact pads are wettable by the liquid in the switching channel. The contact pads are preferably constructed of a wettable metal. In an exemplary embodiment, electrical circuitry to allow connection to the piezoelectric actuator is formed on the circuit substrate.

The optical relay of the present invention can be made using micro-machining techniques for small size. The switching time is short, yielding switching rates of several kHz or higher. Heat generation is also low, since the only heat generators are the piezoelectric element and the passage of control currents through the conductors to the piezoelectric elements.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A piezoelectric optical relay, comprising:
    a relay housing containing a switching channel;
    a first optical path passing through the switching channel;
    a solid slug adapted to move within the switching channel;
    a first piezoelectric actuator operable to impart an impulsive force to the solid slug to move the solid slug to a first position within the switching channel to block the first optical path; and
    a second piezoelectric actuator operable to impart an impulsive force to the solid slug to move the solid slug to a second position within the switching channel to unblock the first optical path.

2. A piezoelectric optical relay in accordance with claim 1, further comprising:
    a pressure relief channel; and
    first and second pressure relief vents opening to and connecting the ends of the switching channel to the pressure relief channel and adapted to relieve pressure in the switching channel when the solid slug is moved.

3. A piezoelectric optical relay in accordance with claim 2, wherein the switching channel is narrowed in the vicinity of the first and second pressure relief vents to dampen motion of the solid slug.

4. A piezoelectric optical relay in accordance with claim 1, wherein the solid slug has a surface wettable by a liquid, the relay further comprising:
    a first contact pad located in the switching channel and having a surface wettable by a liquid;
    a second contact pad located in the switching channel and having a surface wettable by a liquid; and
    a liquid volume in wetted contact with the solid slug;
    wherein the liquid volume is adapted to wet between the solid slug and the first contact pad when the solid slug is in the first position and to wet between the solid slug and the second contact pad when the solid slug is in the second position.

5. A piezoelectric optical relay in accordance with claim 4, further comprising:
    a third contact pad located in the switching channel between the first and second contact pads, the third contact pad being in wetted contact with the liquid volume.

6. A piezoelectric optical relay in accordance with claim 5, wherein the first optical path lies between the first and third contact pads.

7. A piezoelectric optical relay in accordance with claim 6, further comprising a second optical path, lying between the second and third contact pads.

8. A piezoelectric optical relay in accordance with claim 4, wherein the liquid is a liquid metal.

9. A piezoelectric optical relay in accordance with claim 1, wherein the solid slug is magnetic.

10. A piezoelectric optical relay in accordance with claim 1, further comprising:
    a first compliant, energy absorptive facing attached to an end of the first piezoelectric actuator and positioned between the first piezoelectric actuator and the solid slug; and
    a second compliant, energy absorptive facing attached to an end of the second piezoelectric actuator and positioned between the second piezoelectric actuator and the solid slug.

11. A piezoelectric optical relay in accordance with claim 10, wherein the first and second compliant, energy absorptive facings are made of Sorbothane.

12. A piezoelectric optical relay in accordance with claim 1, wherein the relay housing comprises:
    a circuit substrate layer supporting electrical connections to the first and second piezoelectric actuators;
    a cap layer; and
    a switching layer, positioned between the circuit substrate layer and the cap layer, in which the switching channel is formed.

13. A piezoelectric optical relay in accordance with claim 12, wherein the relay housing further comprises:
    a vent layer containing two pressure relief vents; and
    a pressure relief channel formed in one of the cap layer and the vent layer;
    wherein the two pressure relief vents connect the ends of the switching channel to the pressure relief channel.

14. A piezoelectric optical relay in accordance with claim 12, further comprising
    a first optical waveguide positioned in a first alignment notch in the switching layer; and
    a second optical waveguide positioned in a second alignment notch in the switching layer;
    wherein the first and second optical waveguides are axially aligned to form a portion of the first optical path.

15. A piezoelectric optical relay in accordance with claim 14, wherein the first and second optical waveguides are held in the first and second alignment notches respectively by adhesive.

16. A method for switching an optical path in a piezoelectric optical relay having solid slug moveable within a switching channel, the method comprising:
    coupling an input optical signal to an input optical waveguide of the piezoelectric optical relay, the input optical waveguide being optically aligned with an output optical waveguide to form the optical path;
    if the optical path is to be completed:
        energizing a first piezoelectric actuator to move the solid slug out of the optical path, whereby the input optical waveguide is optically coupled to the output optical waveguide; and
    if the optical path is to be broken:
        energizing a second piezoelectric actuator to move the solid slug into the optical path, whereby the input optical waveguide is optically decoupled from the output optical waveguide.

17. A method for switching an optical path in a piezoelectric optical relay in accordance with claims 16, wherein energizing the first piezoelectric actuator causes a face of the piezoelectric actuator to push the solid slug to align with a pressure relief vent opening, thereby relieving any vacuum between the face of piezoelectric actuator and the end of the slug.

18. A method for switching between a first optical path and a second optical path through a switching channel in a piezoelectric optical relay, the relay having a solid slug moveable within the switching channel and the method comprising:

coupling a first input optical signal to a first input optical waveguide of the piezoelectric optical relay, the first input optical waveguide being optically aligned with a first output optical waveguide to form the first optical path;

coupling a second input optical signal to a second input optical waveguide of the piezoelectric optical relay, the second input optical waveguide being optically aligned with a second output optical waveguide to form the second optical path;

if the first optical path is to be selected:
energizing a first piezoelectric actuator to move the solid slug out of the first optical path and into the second optical path, whereby the first input optical waveguide is optically coupled to first output optical waveguide and the second input optical wave guide is optically decoupled from the second output optical waveguide; and if the second optical path is to be selected:
energizing the second piezoelectric actuator to move the solid slug out of the second optical path and into the first optical path, whereby the first input optical waveguide is optically decoupled from first output optical waveguide and the second input optical waveguide is optically coupled to the second output optical waveguide.

* * * * *